United States Patent
Byun

(10) Patent No.: US 9,815,468 B2
(45) Date of Patent: Nov. 14, 2017

(54) EMERGENCY BRAKING FORCE GENERATION SYSTEM AND METHOD

(71) Applicant: Hyundai Motor Company, Seoul (KR)

(72) Inventor: Hyung Suk Byun, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 82 days.

(21) Appl. No.: 14/944,689

(22) Filed: Nov. 18, 2015

(65) Prior Publication Data
US 2017/0066446 A1  Mar. 9, 2017

(30) Foreign Application Priority Data
Sep. 7, 2015 (KR) .................. 10-2015-0126541

(51) Int. Cl.
| | |
|---|---|
| *B60W 10/06* | (2006.01) |
| *B60W 10/30* | (2006.01) |
| *B60W 30/18* | (2012.01) |
| *B60W 10/11* | (2012.01) |
| *F01P 5/04* | (2006.01) |
| *F02D 41/12* | (2006.01) |

(Continued)

(52) U.S. Cl.
CPC ...... *B60W 30/18136* (2013.01); *B60W 10/06* (2013.01); *B60W 10/11* (2013.01); *B60W 10/30* (2013.01); *B60W 30/18* (2013.01); *F01P 5/04* (2013.01); *F02D 41/0225* (2013.01); *F02D 41/107* (2013.01); *F02D 41/123* (2013.01); *B60W 2510/069* (2013.01); *B60W 2710/021* (2013.01); *B60W 2710/0627* (2013.01); *B60W 2710/1005* (2013.01); *F01P 2037/00* (2013.01); *F02D 2250/24* (2013.01)

(58) Field of Classification Search
CPC ..... B60W 10/06; B60W 10/30; F02C 41/123; Y10S 477/906
See application file for complete search history.

(56) References Cited

U.S. PATENT DOCUMENTS

| | | | | |
|---|---|---|---|---|
| 7,650,224 B2 * | 1/2010 | Andrea | ................. | F02D 41/005 60/274 |
| 8,424,507 B2 * | 4/2013 | Reedy | .................... | B60T 10/00 123/320 |

(Continued)

FOREIGN PATENT DOCUMENTS

| | | | |
|---|---|---|---|
| JP | 2000-328975 A | | 11/2000 |
| KR | 10-1995-0000491 A | | 1/1995 |

(Continued)

*Primary Examiner* — Sherry L Estremsky
(74) *Attorney, Agent, or Firm* — Mintz Levin Cohn Ferris Glovsky and Popeo, P.C.; Peter F. Corless

(57) ABSTRACT

An emergency braking force generation system includes: an engine for performing combustion using air and fuel injected from an injector and generating torque; a cooling fan which is rotated by the torque of the engine and supplies air into one side of the engine; a cooling fan clutch that selectively transmits the torque of the engine into the cooling fan; a transmission that varies a gear ratio by receiving the torque of the engine and rotates a driving wheel; and a control portion that controls the cooling fan clutch such that the cooling fan is integrally rotated with the engine when an emergency braking signal is generated so as to increase a load of rotation of the engine through the cooling fan.

11 Claims, 3 Drawing Sheets

(51) Int. Cl.
*F02D 41/02* (2006.01)
*F02D 41/10* (2006.01)

(56) References Cited

U.S. PATENT DOCUMENTS

| | | | |
|---|---|---|---|
| 8,897,983 B2* | 11/2014 | Stander | B60T 10/00 |
| | | | 701/70 |
| 8,938,343 B2* | 1/2015 | Jensen | B60W 10/06 |
| | | | 180/165 |
| 2007/0192010 A1* | 8/2007 | Carlstrom | B60T 1/10 |
| | | | 701/70 |
| 2016/0017570 A1* | 1/2016 | Miyamoto | B60W 10/188 |
| | | | 414/685 |
| 2016/0229295 A1* | 8/2016 | Hoffmann | B60K 6/46 |

FOREIGN PATENT DOCUMENTS

| | | |
|---|---|---|
| KR | 10-0243582 | 11/1999 |
| KR | 10-2003-0050235 A | 6/2003 |
| KR | 10-0510285 B1 | 8/2005 |
| KR | 10-2012-0136937 A | 12/2012 |
| KR | 10-2014-0094292 | 7/2014 |

* cited by examiner

EMERGENCY BRAKING FORCE GENERATION SYSTEM AND METHOD

CROSS-REFERENCE TO RELATED APPLICATION

This application claims under 35 U.S.C. §119(a) the benefit of Korean Patent Application No. 10-2015-0126541 filed in the Korean Intellectual Property Office on Sep. 7, 2015, the entire contents of which are incorporated herein by reference.

BACKGROUND (a) Field of the Invention

The present invention relates to an emergency braking force generation system and method for applying emergency braking force to a driving wheel through an engine and a transmission in the event a brake does not operate normally.

(b) Description of the Related Art

In general, a damping device of a vehicle is used to decelerate or stop a vehicle in motion to maintain the vehicle in a parked state. Usually, a friction-type brake, which converts kinetic energy into thermal energy by friction force and discharges the thermal energy to the outside, is used as the damping device.

The brake is largely divided into a foot brake mainly used when driving, and a hand brake used when parking. An operation apparatus is categorized as a mechanical type using a rod or a wire, and a hydraulic pressure type using a hydraulic pressure, and the main brake usually uses the hydraulic pressure type. In addition, an air brake using compressed air and a booster type of brake using intake back pressure or compressed air to reduce operating force may be provided.

The air brake using pressure of compressed air in order to compress a brake shoe on a drum is used in large trucks, buses, and trailers.

When a wheel is locked, riding comfort often is deteriorated. If a front wheel is locked, a steering state may be unstable, and if a rear wheel is locked, straight movement ability may be deteriorated. Therefore, an anti-lock brake system is provided in order to prevent the wheels from being locked However, if an engine or a power device is in a state of unexpected impossible operation, a brake booster does not perform, and the brake enters an abnormal state. Accordingly, a serious traffic accident may occur. And if a master cylinder is in a non-operation state, hydraulic pressure for braking the vehicle is not applied, and thus supplying sufficient braking force may be difficult.

The related art includes Korean Laid Open patent No. 10-2014-0094292 and Korean Patent Application No. 10-1996-0053644.

The above information disclosed in this Background section is only for enhancement of understanding of the background of the invention and therefore it may contain information that does not form the prior art that is already known in this country to a person of ordinary skill in the art.

SUMMARY

The present invention provides an emergency braking force generation system and method for applying emergency braking force to a driving wheel through a cooling fan, an engine, and a transmission in the event a brake does not operate normally.

As described above, an emergency braking force generation system according to an exemplary embodiment of the present invention may include: an engine for performing combustion using air and fuel injected from an injector and generating torque; a cooling fan which is rotated by the torque of the engine and configured to supply air into one side of the engine; a cooling fan clutch configured to selectively transmit the torque of the engine into the cooling fan; a transmission configured to vary a gear ratio by receiving the torque of the engine and rotate a driving wheel; and a control portion configured to control the cooling fan clutch such that the cooling fan is integrally rotated with the engine when an emergency braking signal is generated so as to increase a load of rotation of the engine through the cooling fan.

When the emergency braking signal is generated, the control portion may turn off the injector in order to stop injecting the fuel.

When the emergency braking signal is generated, the control portion may control the transmission to be shifted to a first gear or a second gear.

The control portion may generate the emergency braking signal based on an operation signal and a vehicle running speed.

When the emergency braking signal is generated, the control portion may control the engine and the transmission such that the torque of the driving wheel is transmitted to the engine through the transmission.

The cooling fan clutch, the transmission, and the driving wheel may be sequentially disposed on one torque transmission route.

An emergency braking force generation method according to an exemplary embodiment of the present invention may include: sensing an emergency braking signal; and integrally rotating the engine and cooling fan when it is determined that the emergency braking signal is generated by operation of the cooling fan clutch which is positioned on a torque transmission route between the engine and the cooling fan.

The emergency braking force generation method may further include stopping fuel injection by controlling an injector which is disposed at the engine.

The emergency braking force generation method may further include lowering a shift-speed of a transmission which varies and outputs a gear ratio by receiving torque of the engine.

If an operation signal of a brake pedal is sensed, then the engine and the cooling fan may be integrally rotated.

A non-transitory computer readable medium containing program instructions executed by a processor can include: program instructions that sense an emergency braking signal; and program instructions that integrally engage an engine with a cooling fan in a maximum rotation speed when it is determined that the emergency braking signal is generated by operation of the cooling fan clutch which is positioned on a torque transmission route between the engine and the cooling fan.

Therefore, when a damping device of the vehicle is out of order, the present invention may maximize emergency braking force transmitted to the driving wheel by maximizing rotation load of the cooling fan, the engine, and the transmission.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

An exemplary embodiment of the present invention will hereinafter be described in detail with reference to the accompanying drawings.

Figure 1:
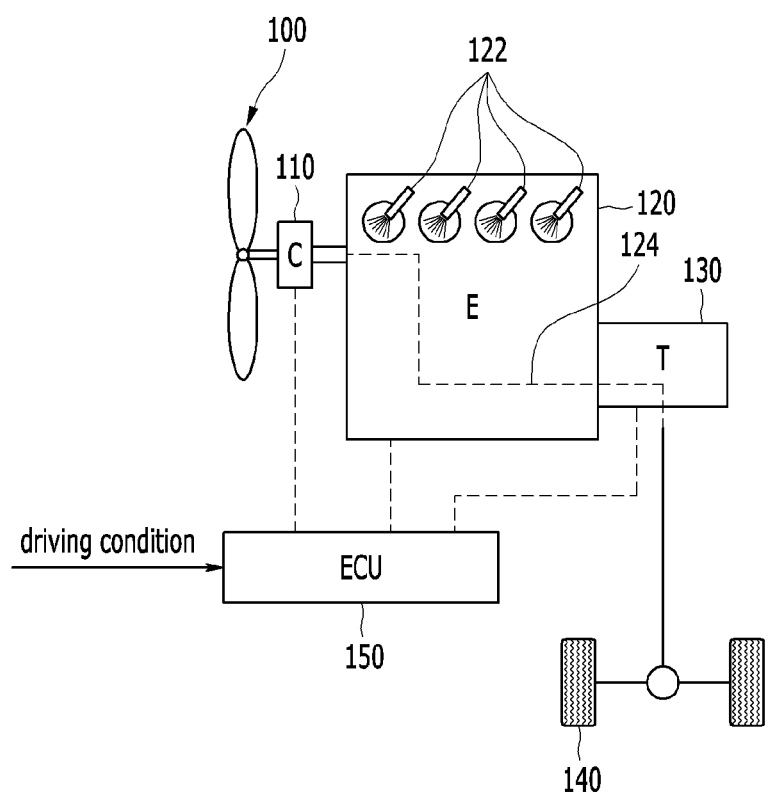
FIG. 1 is a schematic diagram of an emergency braking force generation system according to an exemplary embodiment of the present invention.

FIG. 1 is a schematic diagram of an emergency braking force generation system according to an exemplary embodiment of the present invention.

Referring to FIG. 1, an emergency braking force generation system includes a cooling fan 100, a fan clutch 110, an engine 120, an injector 122, a torque transmission route 124, a transmission 130, a driving wheel 140, and a control portion 150.

The engine 120 injects a fuel at the injector 122, and torque is generated by combustion using the injected fuel and air.

Some of the torque generated at the engine 120 is transmitted to the cooling fan 100 through the cooling fan clutch 110 and transmitted to the driving wheel 140 through the transmission 130 along the torque transmission route 124.

Conversely, if the engine brake is operated, the torque of the driving wheel 140 is transmitted to the engine 120 along the torque transmission route 124, and the torque transmitted to the engine 120 is transmitted to the cooling fan 100 through the cooling fan clutch 110.

The control portion 150 may control the cooling fan clutch 110, the injector 122 of the engine 120, and the transmission 130, respectively.

The control portion 150 may be realized by at least one microprocessor activated by a predetermined program, and the predetermined program can be programmed to include a set of instructions to perform steps in a method according to an exemplary embodiment of the present invention, which will be described in more detail later.

Figure 2:
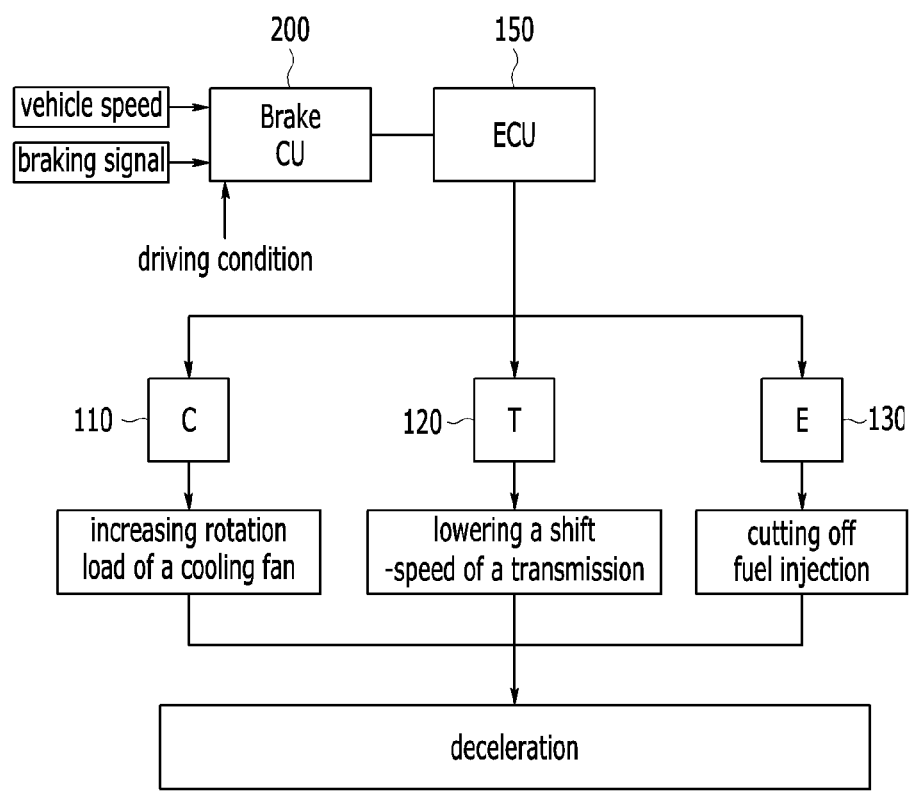
FIG. 2 is a block diagram illustrating an emergency assistance braking force generation method according to an exemplary embodiment of the present invention.

FIG. 2 is a block diagram illustrating an emergency assistance braking force generation method according to an exemplary embodiment of the present invention.

Referring to FIG. 2, a driving condition including a vehicle speed and a braking signal of the brake is inputted into a brake control portion 200, and an emergency braking signal is generated according the inputted driving condition.

If it is determined that the emergency braking signal is generated, then the control portion 150 controls the cooling fan clutch 110, the transmission 130, and the injector 122 of the engine 120.

The control portion 150 operates the cooling fan clutch 110 to increase a rotation load of the cooling fan 100, and lowers a shift-speed of the transmission 130. For example, the control portion may adjust the transmission to be shifted to a first gear or a second gear to increase the rotation load. In addition, the engine 120 turns off the injector 122 to cut off fuel injection.

Therefore, the cooling fan 100, the engine 120, and the transmission 130 may generate emergency braking force through the torque transmission route 124 by increasing the rotation load to a side of the driving wheel 140.

The cooling fan 100 may generate about 50 kW of emergency braking force according to an exemplary embodiment of the present invention.

Figure 3:
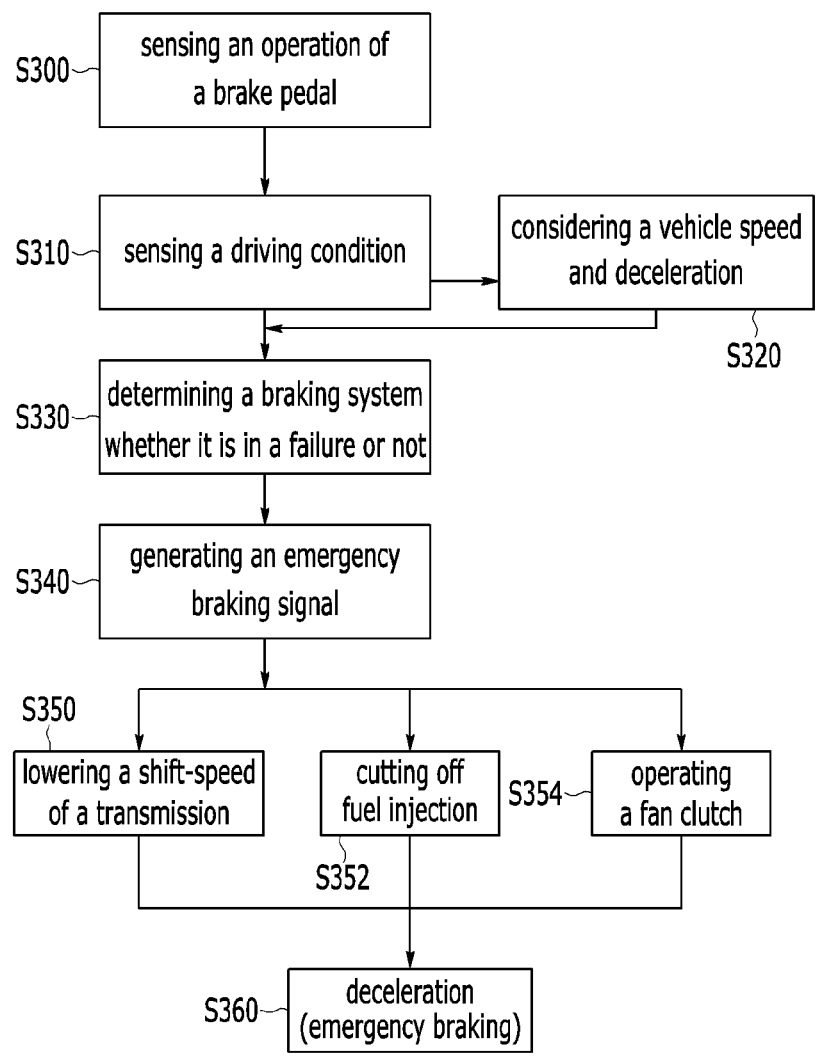
FIG. 3 is a flowchart illustrating an emergency assistance braking force generation method according to an exemplary embodiment of the present invention.

FIG. 3 is a flowchart illustrating an emergency assistance braking force generation method according to an exemplary embodiment of the present invention.

Referring to FIG. 3, in step S300, an operation signal of a brake pedal (not shown) is sensed. Thereafter, the driving condition is sensed in step S310, and the driving condition such as a vehicle speed and deceleration may be calculated in step S320.

In step S330, it is determined that a braking system is in a failure state. According to an exemplary embodiment of the present invention, whether the braking system is in a failure state or not is established via parameters known to those skilled in the art and the detailed description is not provided.

If the braking system is in a failure state in step S330, and the operation signal of brake pedal is sensed in step S300, then the emergency braking signal is generated in step S340.

In step S350, the control portion 150 lowers a shift-speed of the transmission 130. In other words, the shift-speed is shifted to a first gear or a second gear, and in step S352, the control portion 150 turns off the injector 122 to cut off fuel injection. Further, in step S354, the control portion 150 operates the cooling fan clutch 110 to integrally rotate with the engine 120.

In step S360, accordingly, the braking force is applied to the driving wheel 140 by the cooling fan 100, the engine 120, and the transmission 130. The driving wheel 140 is controlled to integrally rotate with the transmission 130, the engine 120, and the cooling fan clutch 110 according to an exemplary embodiment of the present invention. Therefore, performance of the engine brake may be improved. Moreover, when a damping device of the vehicle is out of order, the present invention may maximize emergency braking force transmitted to the driving wheel by maximizing rotation load of the cooling fan, the engine, and the transmission.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An emergency braking force generation system, comprising:
   an engine for performing combustion using air and fuel injected from an injector and generating torque;
   a cooling fan which is rotated by the torque of the engine and configured to supply air into one side of the engine;
   a cooling fan clutch configured to selectively transmit the torque of the engine into the cooling fan;
   a transmission configured to vary a gear ratio by receiving the torque of the engine and rotate a driving wheel; and
   a control portion configured to control the cooling fan clutch such that the cooling fan is integrally rotated with the engine when an emergency braking signal is generated so as to increase a load of rotation of the engine through the cooling fan.

2. The emergency braking force generation system of claim 1, wherein when the emergency braking signal is generated, the control portion turns off the injector in order to stop injecting the fuel.

3. The emergency braking force generation system of claim 2, wherein when the emergency braking signal is generated, the control portion controls the transmission to be shifted to a first gear or a second gear.

4. The emergency braking force generation system of claim 1, wherein the control portion generates the emergency braking signal based on an operation signal and a vehicle running speed.

5. The emergency braking force generation system of claim 1, wherein when the emergency braking signal is generated, the control portion controls the engine and the transmission such that the torque of the driving wheel is transmitted to the engine through the transmission.

6. The emergency braking force generation system of claim 1, wherein the cooling fan clutch, the transmission, and the driving wheel are sequentially disposed on one torque transmission route.

7. An emergency braking force generation method, comprising the steps of:
   sensing an emergency braking signal; and
   integrally engaging an engine with a cooling fan in a maximum rotation speed by operation of a cooling fan clutch which is positioned on a torque transmission route between the engine and the cooling fan when it is determined that the emergency braking signal is generated.

8. The emergency braking force generation method of claim 7, further comprising the step of:
   stopping fuel injection by controlling an injector which is disposed at the engine.

9. The emergency braking force generation method of claim 7, further comprising the step of:
   lowering a shift-speed of a transmission which varies and outputs a gear ratio by receiving torque of the engine.

10. The emergency braking force generation method of claim 7, wherein if an operation signal of a brake pedal is sensed, then the engine and the cooling fan are integrally rotated.

11. A non-transitory computer readable medium containing program instructions executed by a processor, the computer readable medium comprising:
    program instructions that sense an emergency braking signal; and
    program instructions that integrally engage an engine with a cooling fan in a maximum rotation speed by operation of a cooling fan clutch which is positioned on a torque transmission route between the engine and the cooling fan when it is determined that the emergency braking signal is generated.

* * * * *